Jan. 16, 1945.  J. MIHALYI  2,367,514
EXPOSURE INDICATING SPOOL AND CAMERA SUPPORT THEREFOR
Filed June 30, 1942

JOSEPH MIHALYI
INVENTOR
BY
ATTORNEYS

Patented Jan. 16, 1945

2,367,514

UNITED STATES PATENT OFFICE 2,367,514

EXPOSURE INDICATING SPOOL AND CAMERA SUPPORT THEREFOR

Joseph Mihalyi, Rochester, N. Y., assignor to Eastman Kodak Company, Rochester, N. Y., a corporation of New Jersey Application June 30, 1942, Serial No. 449,052

14 Claims. (Cl. 242—71)

This invention relates to photography and more particularly to film spools for indicating when film wound thereon has been exposed and for a camera mounting for supporting such film spools. One object of my invention is to provide a film spool of a type in which a film is permanently attached to the film spool core and in which the film is unwound, exposed, and rewound upon the film spool in which there is a signal to inidcate to an operator when the film has been exposed. Another object of my invention is to incorporate in a film spool a means for preventing the film spool from being improperly loaded into a camera. Another object of my invention is to provide a film spool with a signalling means to indicate when film wound on the spool has been exposed, this signal also serving as a means for preventing the improper insertion of the film spool into a camera. Still another object of my invention is to provide a film spool with a special type of spool-supporting device which cooperates with the spool signal to prevent improper mounting of the spool on a camera. Other objects will appear from the following specification, the novel features being particularly pointed out in the claims at the end thereof.

In the past it has generally been customary to provide a photographic camera with two film spools, winding the film from one spool to the other as exposures are made. Each time a new film is loaded into such cameras, it is threaded to a spool in the opposite film chamber. In a second type of known cameras film is attached to a second film spool on which it is wound during exposure and from which it is wound after exposure to the original film spool. Still another type of camera has been recently suggested in which only one spool is used in a camera from which the film is propelled preparatory to making exposures and on which the film is again wound after exposures are made. Typical examples of such cameras are shown in my copending applications Serial No. 426,744, Roll holding camera, filed January 14, 1942; and 428,897, Shutter and camera structure, filed January 30, 1942, now Patent No. 2,338,657, granted January 4, 1944. While my present invention is not necessarily confined to the types of cameras shown in my copending applications, it is nevertheless particularly adapted for use with such cameras.

With the type of camera shown in the copending applications I preferably use a small metal film spool in which the film strip is permanently attached to the core of the film spool and preferably in which the film relies on an opaque backing to prevent light from reaching the sensitive surface. I may, of course, use the well known backing paper, but I prefer to omit the backing paper entirely. Where this is done, it is usually difficult to determine whether or not the film has been exposed, since the same end of the film strip lies outermost on the film spool when completely wound on the spool, both before and after exposure. It is for this reason that it is desirable to have some means of definitely determining whether or not the film has been exposed, and it is in part for this reason that I have provided the exposure indicating spool which will be hereinafter described. However, my spool has an additional function in that it not only provides a signal for indicating when the film is exposed as described above, but it also provides a definite means for preventing the improper insertion of the film spool in a camera in loading it into a camera for exposures.

Coming now to the drawing wherein like reference characters denote like parts throughout:

Figure 1:
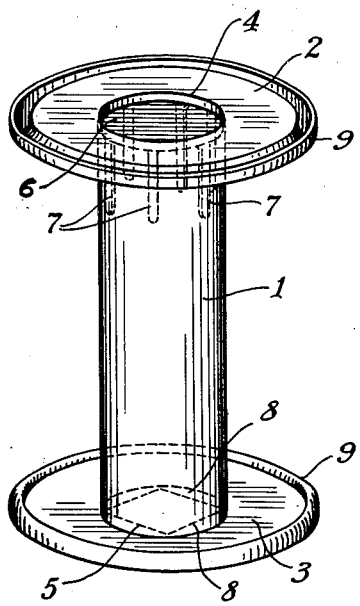
Fig. 1 is a perspective view of a typical film spool including an indicating signal constructed in accordance with and embodying a preferred form of my invention.

My invention comprises broadly providing a spool with a movable signal which is moved from an inconspicuous position to a position in which it may be readily seen by an operator by properly positioning the spool in a camera so that exposures may be made on the film carried by the spool. My invention also includes a special type of spool mount which cooperates with the spool and signal in such a manner that if the spool is improperly loaded in the camera, the camera cannot be closed, and the attention of the operator will be immediately drawn to the improper position of the spool so that by loading the spool correctly the signal will be restored to a predetermined position.

A preferred form of my invention may include a metallic spool having a cylindrical hub 1 to which an upper flange 2 and a lower flange 3 may be attached in any known manner, as by spot winding. I prefer to provide the upper flange 2 with a round opening 4 of the size of the tubular hub 1 and to provide the lower flange 3 with a square opening 5 which may drivingly engage a wind key post on a camera. Inside of the tubular hub 1 I prefer to mount a signal 6 which in this case consists of a thin metal disk from which spring arms 7 extend downwardy to frictionally engage the inside of the tubular hub 1. If this disk is moved downwardly from the position shown in Fig. 1, it is obvious that one or more of the spring arms 7 will strike the flanges 8 which surround the square aperture 5, thus preventing the signal from being moved or the spool from being properly loaded in a camera, as will be later explained.

In Fig. 1 the signal 6 is in the position which it assumes after the film on the spool has been exposed. Before exposure, as supplied to a customer, the signal 6 lies in the lower portion of the tubular hub 1 with the spring arms 7 adjacent the flanges 8 so that by looking at the spool the signal is not particularly visible.

I prefer to lacquer the spool in a contrasting color from the signal; as for instance, the spool may be black, and the signal 6 may be lacquered some contrasting bright color such as red, yellow, green, or the like. Thus when the signal 6 is in the position shown in Fig. 1, the bright color of the signal contrasting with the color of the spool will immediately call an operator's attention to the fact that the film carried by the spool has been exposed.

In Fig. 1 I have shown the signal as equipped with six spring arms 7, and I have shown the signal as consisting of a disk closely fitting the inside diameter of the core 1.

Figure 2:
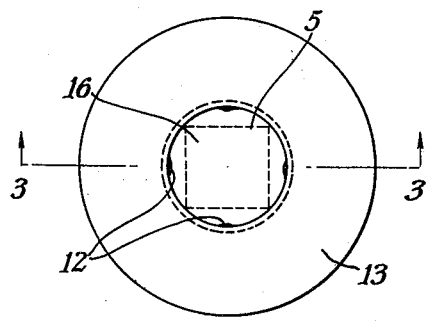
Fig. 2 is a top plan view of a slightly different form of film spool utilizing a signal in accordance with my invention.
Figure 3:
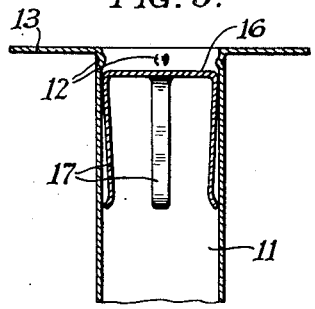
Fig. 3 is a section taken on line 3—3 of Fig. 2.
Figure 5:
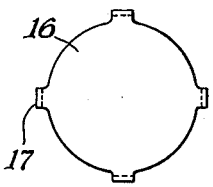
Fig. 5 is a top plan view of a slightly different embodiment of the signalling device which may be used with a film spool.
Figure 6:
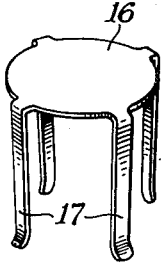
Fig. 6 is a perspective view of the signal shown in Fig. 5.
Figure 7:
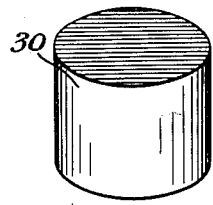
Fig. 7 is a perspective view of the signal used with the embodiment of my invention shown in Fig. 4.
Figure 8:
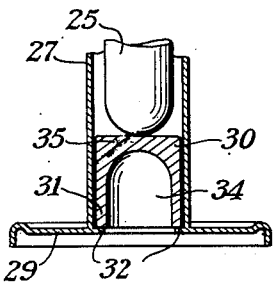
Fig. 8 is a fragmentary detailed section of the position which the signal of Fig. 7 would assume if the spool is improperly loaded into a camera.

In a slightly different embodiment shown in Figs. 5 and 6, the signal may consist of a disk 16 of a diameter somewhat smaller than the inside diameter of the core 1 and having spring arms 17, here shown, extending from the periphery of the disk. When this type signal is used, as indicated in Figs. 2 and 3, the film spool core 11 may be provided with slight indentations 12 near the end of this hub 11 so that these indentations will serve as snap latches past which the signal may be pushed, but which will normally hold the signal inside of the hub member 11. In this instance the spool flanges 13 are in the shape of a plain disk and do not include the edge formings 9 shown in Fig. 1. These formings may have some advantages for certain types of work.

Figure 4:
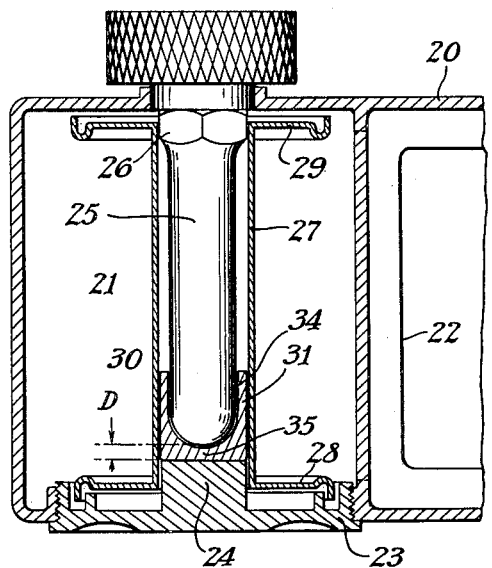
Fig. 4 is a fragmentary sectional view showing a portion of a camera and a spool and signal constructed in accordance with a slightly different form of my invention and showing the means for supporting the film spool in a camera.

Fig. 4 illustrates a portion of a camera 20 which includes a spool chamber 21 on one side of an exposure frame 22, this spool chamber being accessible by a screw cap 23 as described in my copending application Serial No. 426,744. In the present instance the screw cap 23 carries a spool centering pin 24 coaxially arranged with a spool centering pin 25 having a squared end 26 to drivingly engage the square aperture 5 in the film spool.

It should be noticed that there is a comparatively short distance D between the ends of the spool centering pins 24 and 25. This distance may of course vary with different embodiments of my invention, but its purpose is to prevent the spool from being improperly loaded. If it is assumed that the spool 27 is improperly positioned in the camera 20, and that the flange 28 has been inserted over the pin 25 instead of the flange 29, it will be obvious that the spool centering pin 25 will engage the signal 30 and thrust the flanged end 31 through the tubular hub 27 until the flanged end 31 engages the flanges 32 which correspond with the flanges 8 of the spool in Fig. 1. This sliding movement of the signal 30 will be such as to prevent the spool from fully entering the spool chamber 21, and consequently the spool cover 23 cannot be placed on the camera. The operator will immediately note that the camera cannot be closed and will pull out the film spool and reverse the end signal, placing it on the spool centering post 25. This time as the spool is shoved on the shaft 25, the end of the post 25 will enter the recess 34 in the signal so that the distance D between the posts 24 and 25 will give sufficient clearance to that part 35 of the signal which will lie between the two key posts.

With the form of the invention shown in Fig. 1, the same results will be obtained because if properly loaded, the end of the key post 25 will pass inside of the downwardly extending spring fingers 7; or if improperly loaded, the spring fingers 7 through contact with the flanges 8 will prevent the spool from having fully entered into the camera.

In all of the illustrated embodiments of my invention it is obvious that it will be impossible to improperly load the film spool in the camera. It should also be noticed that each time the film spool is loaded into the camera, the signal 6 or 16 or 30 will be moved from a position in which it is not noticeable to a position in the end of the film spool core, in which it is extremely noticeable. and in which it will indicate to an operator that the film has been exposed.

It is obvious that various different embodiments of my invention may be readily designed to suit the particular size and type of camera and film spool, and I consider as within the scope of my invention all such forms as may come within the scope of the appended claims.

What I claim is:

1. An exposure indicating film spool comprising a hollow hub, flanges carried by the ends of the hub, a slide member substantially closing the hollow hub and frictionally engaging the inside thereof to form a readily viewable signal member when in one position.

2. An exposure indicating film spool comprising a hollow hub, flanges carried by the ends of the hub, a slide member substantially closing the hollow hub and frictionally engaging the inside thereof to form a readily viewable signal member when in one position, one spool flange including a polygonal aperture of a width less than the diameter of the hollow hub for limiting the movement of the slide member in one direction, the length of the hollow hub being such as to substantially obscure the signal in one position.

3. An exposure indicating film spool comprising a hollow hub, flanges carried by the ends of the hub, a slide member substantially closing the hollow hub, said slide member including a frictional surface extending to one side of the slide member positioned to frictionally engage the inside wall of the hollow hub to hold said slide member in a predetermined position.

4. An exposure indicating film spool comprising a hollow hub, flanges carried by the ends of the hub, a slide member substantially closing the hollow hub, said slide member including a frictional surface extending to one side of the slide member positioned to frictionally engage the inside wall of the hollow hub to hold said slide member in a predetermined position, said frictional surface being shaped to follow the contour of the hollow hub and having a central recess adapted to receive a spool centering pin, said slide member constituting a visible signal when located near one end of the hollow hub.

5. An exposure indicating spool adapted for mounting on a camera including spool centering pins extending toward each other throughout substantially the length of the film spool comprising a tubular hub adapted to slidably engage the spool centering pins, a signal slidably mounted in the tubular hub, and a frictional part carried by the signal engaging the inside of the hollow hub and at least partially surrounding a portion of a spool centering pin.

6. An exposure indicating spool adapted for mounting on a camera including spool centering pins of different shapes extending toward each other throughout substantially the length of the film spool, said spool comprising a tubular hub, flanges attached to the hub, one flange including a polygonal opening having walls extending partially over an end of the tubular hub and adapted to slidably engage one of the spool centering pins, a signal slidably mounted in the tubular hub, and a frictional part carried by the signal engaging the inside of the hollow hub and at least partially surrounding a portion of a spool centering pin, said signal and frictional part thereof being of such dimensions that walls of the polygonal opening in the said flange may prevent said signal from sliding therethrough.

7. An exposure indicating spool adapted for mounting on a camera including spool centering pins extending toward each other throughout substantially the elngth of the film spool comprising a tubular hub adapted to slidably engage the spool centering pins, a signal slidably mounted in the tubular hub, and a frictional part carried by the signal engaging the inside of the hollow hub and at least partially surrounding a portion of a spool centering pin, the thickness of said signal being less than the spacing between the ends of said spool centering pins.

8. A film spool, for cameras including film centering pins of unequal length and diameter and comprising a tubular hub, flanges carried by the tubular hub, a slidable signal having one flat wall substantially filling the tubular hub and having a portion extending from the flat wall of a shape to fill only a small portion of the hollow hub, said signal being slidably mounted in said hub and so positioned that by placing the spool on one spool centering pin said signal may definitely prevent complete movement of said spool centering pin into the spool hub.

9. A film spool for cameras including film centering pins of unequal length, one a long pin, the other a short pin, said spool comprising a tubular hub, flanges carried by the tubular hub, walls forming a square opening in one flange the walls of which partially close one end of said tubular hub, a slidable signal mounted in the hollow hub of a size that may not pass through said square opening, said long spool centering pin being adapted to engage said signal whereby the flange with a square opening, when said spool is improperly loaded, may hold said signal in a position to prevent said spool from being properly supported by the spool centering pins.

10. In a roll holding camera, the combination with a camera body, of spool centering pins coaxially mounted thereon, one pin being several times the length of the other pin, a spool including a hollow hub, flanges on the hub and openings therein through which the spool centering pins may pass into the hub, and a signal member slidably mounted in the hollow hub and of less thickness than the spacing between the spool centering pins.

11. In a roll holding camera, the combination with a camera body, of spool centering pins coaxially mounted thereon, one pin being several times the length of the other pin, a spool including a hollow hub, flanges on the hub and openings therein through which the spool centering pins may pass into the hub, and a signal member slidably mounted in the hollow hub and of less thickness than the spacing between the spool centering pins, one flange including a polygonal opening, a polygonal portion on one spool centering pin for drivingly engaging said opening, said spool centering pins being adapted to slide the signal member to a predetermined position when both spool centering pins enter said hollow spool hub when said spool is properly loaded therein.

12. In a camera adapted for use with a film spool including a hollow hub, a signal slidably mounted in said hub and definitely shaped openings in the ends of said hub, one a polygonal opening and the other a round opening, the combination with a camera body, of means for supporting said film spool therein comprising two coaxially arranged spool centering pins carried by the camera body, one spool centering pin having a smaller diameter than the other spool centering pin, said spool centering pin of smaller diameter including a polygonal formation adapted to fit the polygonal hub opening, the spool centering pin including the larger diameter being adapted to fit in the round opening of the hollow hub, the first-mentioned spool centering pin being of a length to engage and slide said signal at least partially through the hollow hub when said spool is placed thereon.

13. In a camera adapted for use with a film spool including a hollow hub, a signal slidably mounted therein, said spool including a round opening in one end of said hub and a polygonal opening in the other end of said hub, the combination with a camera body, of means for supporting a film spool therein comprising two coaxially arranged spool centering pins positioned on the camera body, one spool centering pin being materially longer and thinner than the other spool centering pin and both spool centering pins being adapted to extend different distances into the hollow hub of the spool for positioning said signal therein, the two spool centering pins being of a length to closely approach each other but having a relatively small space therebetween, the longer spool centering pin including a polygonal portion fitting the polygonal opening in said film spool and the shorter film spool centering pin fitting into the round opening of said film spool hub.

14. In a roll holding camera, the combination with a camera body, of spool centering pins coaxially mounted thereon, one pin being several times the length of the other pin, a spool adapted to be centered by said pins including a hollow hub, flanges on the hub and openings therein through which the spool centering pins may pass into the hub, and a signal member slidably mounted in the hollow hub and adapted to move therein to an exposed film indicating position, said signal being of less thickness than the spacing between the spool centering pins, one flange including a plurality of walls forming a polygonal opening, said plurality of walls partially closing one end of the hollow hub, whereby by placing the spool on one spool centering pin in one direction the spool centering pin may move into said hub and may move the signal from the walls of the polygonal opening to a position indicating that film on the spool has been exposed.

JOSEPH MIHALYI.